United States Patent
Halk et al.

(10) Patent No.: US 9,352,264 B2
(45) Date of Patent: May 31, 2016

(54) APPARATUS, METHODS AND SYSTEMS FOR REMOVING PARTICULATE IMPURITIES FROM ABOVE A SHALE SHAKER

(71) Applicant: Anchor Oilfield Services, LLC, Indianapolis, IN (US)

(72) Inventors: Mark Halk, Houston, TX (US); Edward Moyer, Newcomerstown, OH (US)

(73) Assignee: ANCHOR OILFIELD SERVICES, LLC, Indianapolis, IN (US)

(*) Notice: Subject to any disclaimer, the term of this patent is extended or adjusted under 35 U.S.C. 154(b) by 99 days.

(21) Appl. No.: 13/896,317

(22) Filed: May 16, 2013

(65) Prior Publication Data

US 2014/0157735 A1    Jun. 12, 2014

Related U.S. Application Data

(60) Provisional application No. 61/647,609, filed on May 16, 2012.

(51) Int. Cl.
| | |
|---|---|
| *B01D 50/00* | (2006.01) |
| *B01D 45/08* | (2006.01) |
| *B01D 46/00* | (2006.01) |
| *B01D 46/52* | (2006.01) |
| *B01D 46/10* | (2006.01) |
| *B07B 1/46* | (2006.01) |
| *B07B 13/16* | (2006.01) |
| *E21B 21/06* | (2006.01) |
| *E21B 21/16* | (2006.01) |

(52) U.S. Cl.
CPC ............. *B01D 50/002* (2013.01); *B01D 45/08* (2013.01); *B01D 46/0002* (2013.01); *B01D 46/0005* (2013.01); *B01D 46/0053* (2013.01); *B01D 46/10* (2013.01); *B01D 46/521* (2013.01); *B07B 1/46* (2013.01); *B07B 13/16* (2013.01); *E21B 21/065* (2013.01); *E21B 21/16* (2013.01); *E21B 2021/061* (2013.01)

(58) Field of Classification Search
CPC .. B01D 50/002; B01D 45/08; B01D 46/0053; B01D 46/0002; B01D 46/0005; B01D 46/521; B01D 46/10; E21B 21/16; E21B 21/065; E21B 2021/061; B07B 13/16; B07B 1/46
USPC ........... 55/317, 462, 422, 435, 495, 487, 428, 55/432, 433, 424–427
See application file for complete search history.

(56) References Cited

U.S. PATENT DOCUMENTS

| | | | | |
|---|---|---|---|---|
| 2,599,139 | A | * | 6/1952 | Stevenson ........................ 96/230 |
| 3,782,080 | A | * | 1/1974 | Gallagher ........................ 96/261 |

(Continued)

FOREIGN PATENT DOCUMENTS

| | | |
|---|---|---|
| CA | 2219053 | 11/1997 |

*Primary Examiner* — Dung H Bui
(74) *Attorney, Agent, or Firm* — Barnes & Thornburg LLP

(57) ABSTRACT

A filter apparatus and assembly for use in association with a shale shaker is described, the apparatus including a generally annular housing, a fluid inlet and outlet, and an air flow-path extending therethrough, the apparatus being adapted to remove contaminants and debris from a fluid flowing from a drilling operation into a shale shaker. In accordance with select aspects of the invention, the filtering assembly has at least one deflection plate mounted inside the housing to aid in reducing or disrupting the velocity of debris within the fluid.

18 Claims, 4 Drawing Sheets

(56) References Cited

U.S. PATENT DOCUMENTS

| | | |
|---|---|---|
| 3,785,498 A * | 1/1974 | Fernandez, Sr. .............. 210/351 |
| 6,059,977 A | 5/2000 | Rowney et al. |
| 6,193,070 B1 | 2/2001 | Rowney et al. |
| 7,175,027 B2 | 2/2007 | Strong et al. |
| 7,571,817 B2 | 8/2009 | Scott et al. |
| 7,905,947 B2 | 3/2011 | Leseman et al. |
| 8,202,336 B1 | 6/2012 | Moe et al. |
| 8,322,464 B2 | 12/2012 | Reddoch, Sr. |
| 2005/0040119 A1 | 2/2005 | Kulbeth |
| 2008/0028935 A1* | 2/2008 | Andersson ...................... 95/272 |
| 2009/0301939 A1 | 12/2009 | Sorensen |
| 2010/0132317 A1* | 6/2010 | Thien .............................. 55/368 |
| 2011/0036633 A1 | 2/2011 | Reddoch |
| 2012/0036675 A1* | 2/2012 | Conrad ........................... 15/347 |

* cited by examiner

APPARATUS, METHODS AND SYSTEMS FOR REMOVING PARTICULATE IMPURITIES FROM ABOVE A SHALE SHAKER

CROSS REFERENCE TO RELATED APPLICATIONS

This application claims priority to U.S. Provisional patent application Ser. No. 61/647,609, filed May 16, 2012, the contents of which are incorporated herein in its entirety.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

The inventions disclosed and taught herein relate generally to filtration of drilling debris, and more specifically is related to systems and assemblies for removing contaminants from fluid streams above and near shale shakers proximate a drilling rig, particularly as associated with methods of drilling well bores in which gas or air is used as a drilling fluid for removing earth cuttings from the well bore, so as to prevent the uncontrolled release of the cuttings into the ambient environment.

2. Description of the Related Art

Within the drilling industry, drilling fluids, such as drilling mud, typically an admixture of an emulsion of water and base oil, clay, and various additives (such as weighting materials, emulsifiers, brines, pH-increasers, and viscosifiers), are pumped down through a drill string into a hydrocarbon-producing subterranean well. The drilling fluid is used to lubricate and cool the drill stem and bit, provide pressure support in the well, and transport cuttings from the working end of the drill bit to the surface. For example, drilling mud is typically pumped through a hollow drill string (pipe, drill collar, bit, etc.) down a wellbore and into a subterranean well, where it exits through holes in the drill bit. As the drilling fluid exits the drill string at the bottom through holes or jets in a drill bit and begins the return journey to the surface, the fluid picks up cuttings (rock bits) and other solids from the well and carries them upwardly away from the bit and out of the well via the annulus between the well and the drill string. Thus, while the drilling fluid performs a number of important functions, as it returns to the surface, it carries with it clays, chemical additives, hydrocarbon particles and water in an oil or water base.

Once the drilling fluid, or "mud", is returned to the surface, equipment such as mud pits and shale shakers are used to remove and separate large amounts of coarse drilling cuttings from the drilling fluids so that the drilling fluids may be reused or recirculated within the well. More specifically, at the top of the well, the solids-laden drilling mud can be introduced to a shale shaker, a device which typically has a series of screens arranged in tiered or flat disposition with respect to each other. The screens catch and remove solids from the mud as the mud passes through them. If drilled solids are not removed from the mud used during the drilling operation, recirculation of the drilled solids can create viscosity and gel problems in the mud, as well as increasing wear in mud pumps and other mechanical equipment used for drilling. The cuttings are generally filtered out of the drilling fluid on a series of filters or screens provided within the shale shaker, which is essentially a vibrating screen where unwanted solids are removed, and the resultant cleaned drilling fluid separated and monitored. The drilling fluid that has passed through the shaker equipment is now clean of coarse debris and is ready to be cleaned via other processes prior to being ready for reuse.

On offshore drilling rigs, where area or space is a precious commodity, the equipment is typically located below the main work deck in an enclosed area. Drilling fluids typically contain a notable amount of volatile organic compounds and fugitive contaminants from the drilling process. This is because when passing through the drilling system, the drilling fluid is heated and hydrocarbon contaminants in the form of mist oil and oil vapor are generated at the shale shakers. For example, when drilling with oil-based drilling fluids or muds, the resultant return fluid has oil vapor concentrations of at least 300% above acceptable levels, as well as an oil "fog" in the area in front of and between the shale shakers. The design of the shale shakers themselves results in exposure of the potentially warm fluid to the workplace atmosphere of this otherwise typically enclosed process loop. Thus, workers in the drilling section of the drill facility, particularly in offshore facilities, are exposed to elevated levels and concentrations of air pollutants generated by the drilling fluids. [Galea, K. S., et al., IOM Research Report TM/10/01, Apr. 10, 2010]. Because of this, the enclosed room is subject to forced ventilation to remove unpleasant and/or hazardous fumes. Depending on where the fumes are vented and the various and changing environmental conditions, the fumes may infiltrate other workspaces on the rig.

Apart from the expense and greater time requirements to drill the well, some circumstances simply do not permit the use of drilling mud or drilling fluids. For example, environmental, preservation and scenic regulations may not permit the discharge of a substantial amount of drilling mud into the adjoining earth formations, particularly if that discharge is likely to have a detrimental impact on water supplies within the earth formation or if the earth formation is adjacent to scenic and natural preserves which may be damaged by the influence of foreign substances penetrating into those formations. In situations like this, air drilling can be used.

Air drilling is a well drilling technique in which air or another gas or mixture of gases is used as the "drilling fluid" to remove the cuttings which are cut, broken, ground, eroded and otherwise separated from an earth formation by the drill bit as the drill bit cuts the well bore into the earth formation. Air, or a mixture of gases, is pressurized on the surface of the earth, forced down the center of a drill string of connected drilling pipes and discharged from the drill bit connected at the bottom end of the drill string. The drill bit cuts a circular opening which is slightly larger than the outside diameter of the drill string, thereby leaving a cylindrical space, called an annulus, between the outside of the drill string and the wall of the well bore. The cuttings which are separated from the earth formation are picked up and carried up the annulus by the flow of air discharged from the drill bit. Once at the surface, the cuttings are discharged into the ambient environment along with the air drilling fluid which carried the cuttings. The air drilling fluid continues to remove the cuttings from the bottom of the well bore, thereby maintaining the cutting efficiency of the drill bit in drilling through the earth formation.

A number of approaches to effectively filtering the debris and reducing the issues of debris and pollutants in the air surrounding shale shakers and similar devices have been described and implemented over the years. Primarily, these approaches involve the use of in-ceiling or ceiling adjacent filtering assemblies with complex ducting and fluid handling mechanics. While sometimes effective, the need for having to replace or clean physical filters, or the cost to repair the filtering system when it is damaged or blocked, leaves much to be desired with these current systems.

Although air drilling has advantages in avoiding some of the detrimental impacts from mud drilling in earth formations which are subject to loss of circulation, the disadvantage of air drilling is that the cuttings carried with the air to the surface of the earth are thereafter discharged directly into the ambient environment at the surface of the well with the air. This discharge may itself create an adverse environmental impact, because the cuttings are free to drift in the natural wind currents throughout the area surrounding the drilling site. In the instance of offshore drilling rigs, such a situation in a restricted environment can be dangerous to the operators near the discharge. Unlike mud drilling where the cuttings are readily separated from the drilling mud and stored in pits, containment ponds or other containers, the cuttings in the air drilling fluid are not believed to have been previously contained or otherwise separated from the discharged air. In those environmental circumstances where the cuttings cannot be discharged into the ambient environment, air drilling is not a preferred method of use.

It is with respect to these and other background factors and considerations that the present invention has resulted. The inventions disclosed and taught herein are directed to systems and apparatus for removing or minimizing air contaminants above or near a shale shaker, as well as methods of using and operating such a system, particularly contaminants or debris contained within a drilling fluid, including air drilling fluids.

BRIEF SUMMARY OF THE INVENTION

The objects described above and other advantages and features of the invention are incorporated in the application as set forth herein, and the associated appendices and drawings, related to systems for an apparatus and system for removing contaminants from the air above a shale shaker.

In accordance with a first embodiment of the present disclosure, an apparatus for use in association with a shale shaker is described, the apparatus comprising a housing having a top, a wall, and a bottom, and a fluid inlet and a fluid outlet; a chamber disposed between the inlet and the outlet, the housing having an air flow path therethrough; and an internal debris deflector plate. The housing can be of many shapes, but most preferably, and for effective use in dispersing debris within the fluid, the housing is circular or ovoid in cross-sectional shape. In accordance with further aspects of this embodiment, a hinged deflector plate proximate the fluid outlet, the deflector plate being adjustable for the angle of deflection of the fluid. In yet another aspect, the apparatus may include one or more wear plates within the housing and proximate to the fluid inlet.

In accordance with a further embodiment of the present disclosure, a system for removing particulate matter from a drilling fluid stream is described, the system comprising an air bonnet assembly having an inlet and a spaced-apart outlet; and a shale shaker comprising at least one vibrating screen, wherein the air bonnet assembly is attached to a top face of the shale shaker and in fluid communication with both the drilling fluid stream and the shale shaker through the outlet; and wherein the particulate matter is filtered from the drilling fluid by passing the drilling fluid through the air bonnet, and then through the shale shaker. In accordance with certain aspects of this embodiment, the drilling fluid is an air drilling fluid. The air bonnet assembly has, in accordance with select aspects, a generally circular housing, and further includes at least one internal deflector plate, and an air or fluid flow path extending therethrough. In accordance with yet another aspect of this embodiment, the inlet of the air bonnet assembly further comprises a flange or other structure for attaching the air bonnet to ductwork conveying a fluid.

BRIEF DESCRIPTION OF THE SEVERAL
VIEWS OF THE DRAWINGS

The following figures form part of the present specification and are included to further demonstrate certain aspects of the present invention. The invention may be better understood by reference to one or more of these figures in combination with the detailed description of specific embodiments presented herein.

Figure 1:
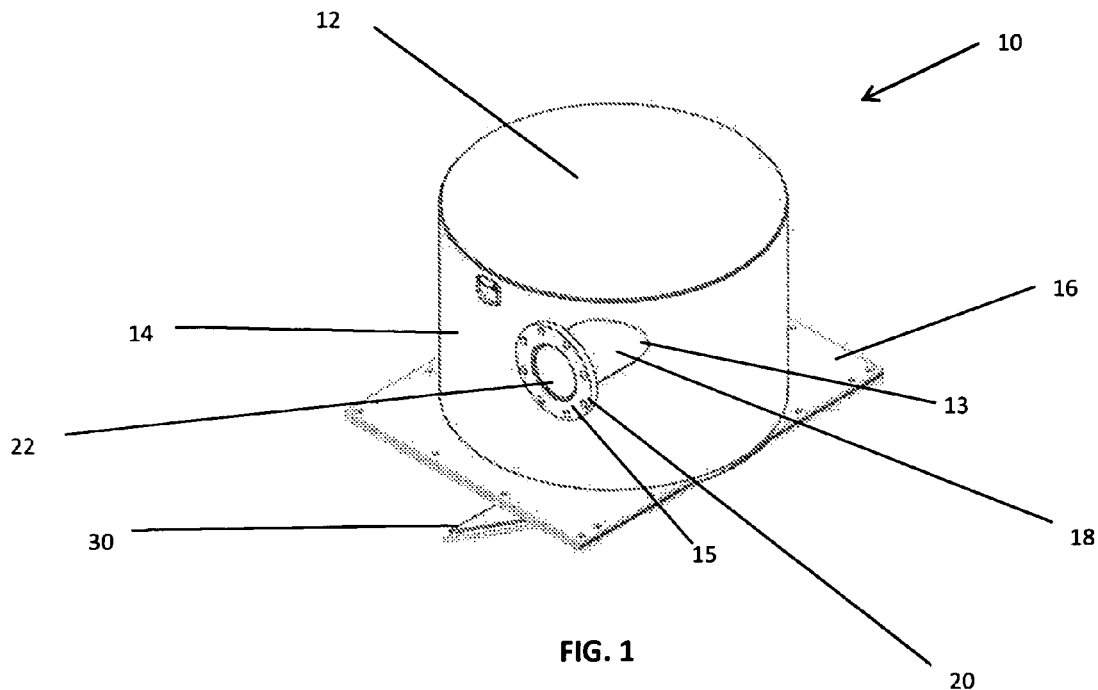
FIG. 1 illustrates a front perspective view of an air bonnet assembly in accordance with aspects of the present disclosure.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Applicants have created apparatus and system for use in association with shale shakers to aid in diverting dust, debris, and other fluid-bourn contaminants from a hydrocarbon recovery fluid stream, such as from a drilling mud or air drilling stream. As used herein, the term "fluid" refers to liquids, gels, foams, gas or gas mixture streams, or any other substantially flowable composition capable of having solid particles of material suspended or dispersed therein.

Figure 2:
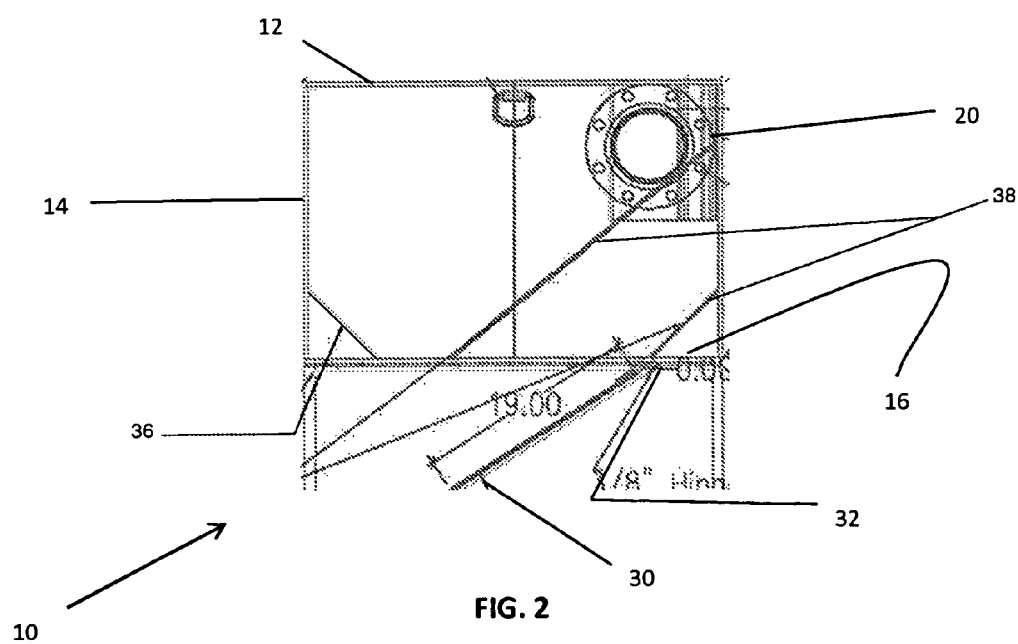
FIG. 2 illustrates a side view of the air bonnet assembly of FIG. 1.
Figure 3:
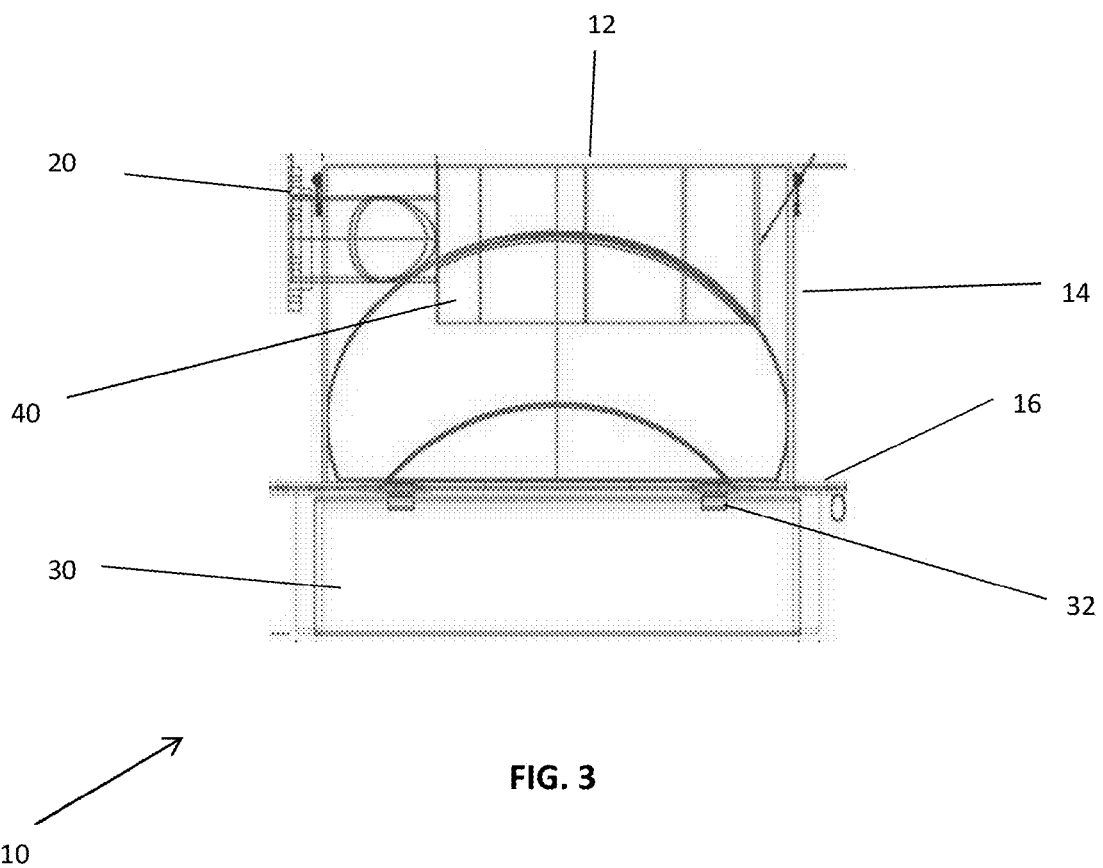
FIG. 3 illustrates a side, cut-away view of the air bonnet assembly of FIG. 1.

Turning now to the figures, FIG. 1 illustrates a perspective view of the air bonnet assembly 10 in accordance with the present disclosure. FIG. 2 is a front view of the air bonnet assembly as viewed toward the connection weld flange 20. FIG. 3 illustrates a cross-sectional view of the assembly of FIG. 1, taken along line 3-3 and showing interior details of the assembly. These figures will now be described in conjunction with each other.

FIG. 1 illustrates a perspective view of an exemplary air bonnet assembly 10 in accordance with the present disclosure. The assembly 10 comprises a housing adapted to contain one or more deflector plates, as will be described in more detail below. The housing includes a top surface 12, and at least one wall 14 having a spaced apart top edge 11a and bottom edge 11b attached to the top surface 12 and forming a generally enclosed structure. As shown in the Figure, wall 14 is a single, annular wall forming a generally circular structure. While the assembly 10 may include one or more wall sections 14 (a plurality of walls) so as to form an assembly of a different shape, e.g., square, rectangular, hexagonal, or polygonal, it is preferred that the assembly have a generally circular or ovoid cross-section, as the curved interior walls of such a shape help to deflect debris and cuttings from the dust and fluid streams passing through the assembly to equipment such as a shale shaker or the like.

On the bottom edge 11b of a wall 14 is a mounting plate, or flange, 16. As shown in FIG. 1, mounting plate 16 can, but is not required to, extend outwardly from the bottom edge 11b of wall 14 in a generally perpendicular manner. In accordance with other aspects of the invention, the mounting plate, or flange, 16 can be substantially coincident with the outer face of wall 14. The mounting plates 16 act to allow the assembly to be coupled or attached to the desired equipment, such as a shale shaker or a possum belly, to form a particle removing system. One or more gaskets 17, such as seen in FIG. 3, may be included below the surface of the assembly 10, or along one or more edges of the bottom face of flange 16, to improve the seal between the air bonnet assembly and the equipment, and minimize or prevent fluid leakage during operation.

A fluid flow inlet 18 having distal and proximal ends, such as a hollow or tubular one piece body, pipe or similar fluid communication means, is joined with the wall 14 proximate the top edge 11a of wall 14, near surface 12, and acts to allow the fluid flow that is to be subjected to a flow rate slowing and particle removal to enter the assembly 10. The hollow tubular one-piece body 18 has a distal end 13 and a spaced apart proximal end 15. A weld flange 20 or similar attachment surface is located near the proximal end 15 of the hollow, tubular body 18 and circumscribes the outer edge of the pipe 18, allowing for attachment of the assembly 10 to a fluid conduit, such as a well drillings fluid return line or the like. The fluid flow inlet 18 includes an inner surface 22 that defines a passageway configured to be in fluid communication with the interior region of the assembly. In use, fluids from the well bore having cuttings and other particulate material suspended or entrained therein enter the assembly via the fluid opening 20 in pipe 18, and flow into the upper region of the assembly 10, and then flow out through a bottom, outlet in the assembly. The fluid flow inlet 18 and the spaced apart, lower outlet of the assembly, and the inner chamber disposed between the inlet and outlet, form a fluid flow path within the interior of the housing of the assembly 10.

As shown more clearly in FIGS. 2 and 3, the bottom face of the assembly 10 includes an outlet formed by deflector plate 30, which is hingedly attached to the bottom face of the assembly via hinge supports 32. Hinge supports 32 may be free-floating hinges, such as to allow the deflector plate to open downwardly from the interior of the air bonnet assembly. Optionally, hinge supports 32 may be controllable hinging means, so as to allow the user of the assembly to manually or automatically (such as via a computer and associated control program or similar device) adjust the angle of the deflector plate 30 downward from the bottom of the assembly. Deflector plate 30, as well as assembly 10, is preferably made of steel or steel alloys, although other materials having high solids impact resistance may also be used as appropriate. While deflector plate 30 is shown to be generally rectangular in shape, it may of any other appropriate shape, depending upon the application of the system. Additionally, while the deflector plate 30 is shown to be of one piece, and of a diameter approximately equal to the diameter of the assembly 10 at its widest point, deflector plate 30 may also be of a width less than the diameter of the assembly, and/or of multiple pieces, so as to add additional levels of fluid or material flow control out of the air bonnet assembly 30 and into the equipment below.

As shown in the cross-sectional view of the air bonnet assembly 10 in FIG. 3, the interior of the assembly 10 further includes at least one larger, primary interior deflection plate, or baffle, 40 proximate to the junction of distal end 13 of the inlet pipe 18 into the interior region of the assembly. The interior of the assembly 10 may also include, advantageously, one or more additional, secondary internal deflector plates, or baffles, 36, 38 oriented within and attached to the interior walls of interior chamber of the assembly. In accordance with select aspects of the present invention, each of the deflector plates 36, 38, 40 preferably has at least one curved edge, the curved edge having a radius of curvature coincident with the radius of curvature of at least one interior face of wall 14. The primary and secondary deflector plates are preferably oriented along the interior surface of wall 14 in a variety of arrangements, including both opposite and overlapping. In accordance with at least one aspect of the disclosure, the primary and secondary baffles are arranged such that at least two deflector plates are at least partially overlapping about the central axis X of the assembly. In other aspects, as shown in FIG. 2, deflector plates 36 and 38 may be arranged such that they are substantially opposite each other about the central axis X.

Additionally, the primary and secondary deflection plates 36, 38, 40 may be oriented at the same downward-sloping angle, or different downward sloping angles. For example, the primary interior deflection plate 40 may be oriented at an angle (the "angle of deflection") ranging from about 20 degrees to about 80 degrees relative to the plane (the "reference plane") defined by the top face 12 of the assembly 10. Similarly, the secondary deflection plate, or plates, 36, 38 may be oriented at an angle ranging from about 30 degrees to about 75 degrees, relative to this same reference plane. In accordance with select aspects of the present invention, the primary and secondary baffles may be oriented at the same angle of deflection relative to each other. In accordance with further aspects, one or more of the baffles may be oriented at an angle of deflection different than the other baffles. The orientation of the baffles will be dependent, in part, on the fluid flow rate into the assembly 10. These structural features serve to deflect debris in the fluid flow path within the fluid flow path through the interior chamber of the housing. In so doing, the deflector plates 36, 38 (and to an extent, the interior wear plate 40 adjacent the inlet 18) aid in diverting such debris, for example, to a possum belly or metal container (e.g., a distribution box or flowline trap) at the head of equipment such as a shale shaker that receives the flow of the drilling fluid and is directly connected to and at the end of the flow line. The purpose of these debris deflection features, in conjunction with a possum belly or similar structure, is to slow the flow rate of the drilling fluid (after it has gained momentum coming down from the flow line) so that it does not shoot off of the shale shaker.

Figure 4:
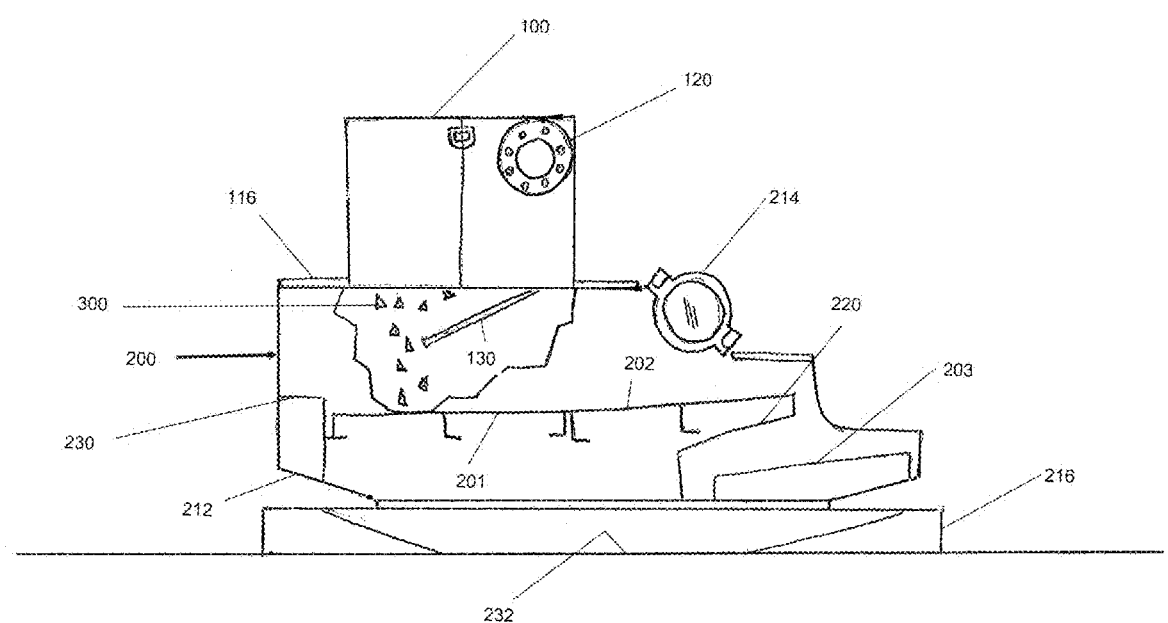
FIG. 4 illustrates an exemplary air bonnet assembly system of the present disclosure in association with a shale shaker.

Referring now to FIG. 4, an air bonnet 100 in accordance with the present disclosure is shown, in mechanical communication with an exemplary shale shaker 200 via surface mounting plates 116 on the bottom of air bonnet assembly 100. Shaker 200 as shown has two top screens 201, 202, and a bottom screen 203 (each covered with screening cloths or similar screening material, as appropriate) on a vibratable screen mounting apparatus or "basket" 212. The basket 212 may be mounted on rubber mounts or springs (not shown), for example, which are supported on a frame assembly 216. In typical operation, the basket 212 is vibrated by a motor and interconnected vibrating apparatus 214 which is mounted on the basket 212 for vibrating the basket and the screens. A pivoting apparatus or a similar adjustment means provides for adjusting the basket inclination. The three screens 201, 202, 203 are shown schematically without defined screen cloth openings, although those of skill in the art will understand that typically such screens use any mesh or cloth, or any combination thereof, on any screen, including but not limited to, a coarser mesh on upper screen(s) and a finer mesh on lower screens.

In use, the air bonnet assembly 100 is attached to the top of the shaker 200 via the base/mounting plate(s) 116. Material (300) to be shaken enters the air bonnet 100 via the flanged fluid inlet opening 120 near the top of the bonnet 100, where it is deflected off the internal deflector plates (as discussed above), and in doing so the deflection resulting in a slowing of the fluid flow rate into the shaker 200, and an initial precipitating out of at least some debris material 300. The solid debris material 300 then enters the shaker 200 by way of the hinged deflector ramp plate 130, providing a manner in which the debris can flow downward in a more controlled manner, further slowing the fluid flow rate into the shaker, and thereafter is introduced onto the first screen 201 from a deflector plate 230. A flowback pan 220 prevents material (e.g. liquid and solid material, 300) flowing through the screen 202 from flowing onto the lower screen 203 and directs such material down into a bottom sump 232 of the shaker 200. A portion of the pan 220 prevents solids on the lower screen 203 from falling into the sump 232. Each screen is held in opposed side mounting channels (not shown) secured to the sides of the basket 212.

Figure 5:
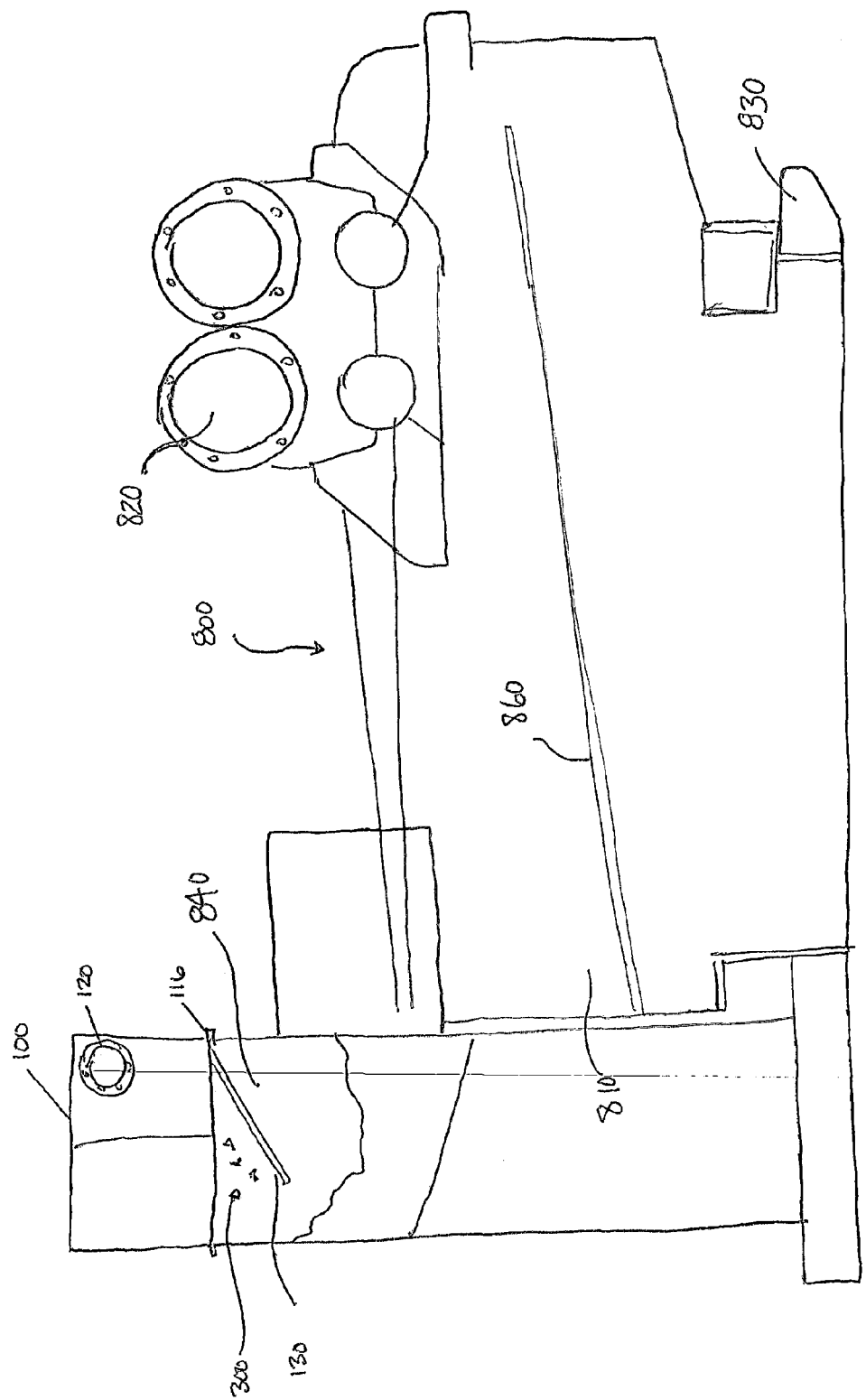
FIG. 5 illustrates a further exemplary air bonnet system in accordance with the present disclosure.

FIG. 5 illustrates a further embodiment of the present disclosure, wherein the air bonnet assembly 100 can be attached to a possum belly 840 associated with a shale shaker 800. Shale shaker 800 has a screen mounting basket 810, a vibration apparatus 820 connected to the basket 810, and a mounting skid 830, with spring mounts (not shown) or the equivalent connecting the basket to the skid 830, similar to the shaker described in association with FIG. 4. The possum belly 840, also referred to as a flow equalizer, is used in association with shale shakers to slow the flow of the returning drilling fluid before it hits, or enters, the shale shaker, thereby preventing the drilling fluid from shooting off of the shale shaker, and enabling the shale shaker to more effectively clean the cuttings out of the drilling fluid before they are returned to the pit for recirculation. It is typically located at the head of the shale shaker to receive the flow of drilling fluid, and is directly connected to and at the end of the flow line. By attaching the air bonnet assembly 100 to the possum belly, further flow rate slowing and control of the drilling fluid stream may be achieved.

In operation, fluid is introduced into the air bonnet assembly 100 by way of the fluid inlet opening 120, wherein solid particulates within the fluid a deflected within the bonnet and their rate of flow is slowed compared to the rate upon entry to the assembly 100. Thereafter, the solid debris 300 and fluid exits the air bonnet assembly via the lower deflector plate 130 and enters the tank, or possum belly, 840. The fluid and particles are then introduced onto a screen assembly within the shale shaker 80. Following further fluid separation, the solids 300 move up and off the screen assembly and are discharged the shale shaker 800.

Other and further embodiments utilizing one or more aspects of the inventions described above can be devised without departing from the spirit of Applicant's invention. For example, additional shaker bonnets as described herein, arranged in series, can be included within a shale/drilling fluid recovery system, depending upon the specifics of the drilling site wherein the system is to be used, thereby making the system highly customizable. Further, the various methods and embodiments of the methods of manufacture and assembly of the system can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. An apparatus for use in association with a shale shaker, the apparatus comprising:
   a housing having a top wall, a bottom wall positioned opposite the top wall, a side wall extending between the top wall and the bottom wall, a fluid inlet formed in the side wall, and a fluid outlet formed in the bottom wall, the top wall, the bottom wall, and the side wall of the housing defining (i) a chamber having a fluid flow path that allows a fluid with debris entrained therein to flow from the fluid inlet to the fluid outlet of the housing, and (ii) a central axis;

a first internal debris deflector plate attached to an interior surface of the side wall at a first position between the fluid inlet and the fluid outlet and extending from the interior surface of the side wall past the central axis, the first internal debris deflector plate being positioned in the fluid flow path and configured to reduce a flow rate of the fluid as it travels along the fluid flow path;

a second internal debris deflector plate attached to the interior surface of the side wall at a second position opposite the first position between the first internal debris deflector plate and the fluid outlet and extending from the interior surface of the side wall past the central axis, the second internal debris deflector plate being positioned in the fluid flow path and configured to reduce the flow rate of the fluid as it travels along the fluid flow path; and a hinged deflector plate coupled to the bottom wall of the housing such that it cooperates with the bottom wall to define the fluid outlet, the hinged deflector plate defining an angle with the bottom wall of the housing such that the hinged deflector plate is positioned in the fluid flow path of the fluid and reduces the flow rate of the fluid as it travels along the fluid flow path;

wherein the first internal debris deflector plate and the second internal debris deflector plate at least partially overlap;

wherein the first position is opposite the second position on the side wall.

2. The apparatus of claim 1, further comprising a wear plate within the housing and proximate to the fluid inlet.

3. The apparatus of claim 1, wherein the first and second internal debris deflector plates are arcuate in shape.

4. The apparatus of claim 1, wherein the first internal debris deflector plate is positioned at an angle ranging from about 20 degrees to about 80 degrees from a vertical axis defined by the housing.

5. The apparatus of claim 1, wherein the second internal debris deflector plate is positioned at an angle ranging from about 30 degrees to about 70 degrees from a vertical axis defined by the housing.

6. The apparatus of claim 1, wherein the hinged deflector plate is variably positioned at an angle ranging from about 30 degrees to about 85 degrees from a vertical axis defined by the housing.

7. The apparatus of claim 1, wherein the hinged deflector plate is attached to the bottom wall of the housing with one or more free-floating hinges.

8. The apparatus of claim 1, wherein the hinged deflector plate is attached to the bottom wall of the housing with one or more controllable hinges.

9. The apparatus of claim 1, wherein:
the fluid inlet includes a distal end coupled to the side wall of the housing and a proximal end configured to be coupled to a fluid conduit and to receive the fluid; and
the first internal debris deflector plate is coupled to the interior surface of the side wall proximate to the distal end of the fluid inlet.

10. The apparatus of claim 1, wherein the bottom wall of the housing includes a mounting plate configured to couple the apparatus to a shale shaker.

11. The apparatus of claim 10, wherein the hinged deflector plate is positioned such that the debris entrained in the fluid is introduced onto a screen of the shale shaker coupled to the housing.

12. The apparatus of claim 11, wherein the debris entrained in the fluid is introduced onto the screen from a deflector plate of the shale shaker.

13. An apparatus for use in association with a shale shaker, the apparatus comprising:
a housing having a top, a wall, a bottom, a fluid inlet, and a fluid outlet;
a chamber disposed between the fluid inlet and the fluid outlet, the housing having a first fluid flow path that allows a first fluid with debris entrained therein to flow from the fluid inlet to the fluid outlet of the housing, the housing defining a central axis;
a first internal debris deflector plate attached to an interior surface of the wall at a first position between the fluid inlet and the fluid outlet and extending from the interior surface of the wall past the central axis;
a second internal debris deflector plate attached to the interior surface of the wall at a second position opposite the first position between the first internal debris deflector plate and the fluid outlet and extending from the interior surface of the wall past the central axis such that the first internal debris deflector plate and the second internal debris deflector plate at least partially overlap; and
a deflector plate hingedly connected to the bottom of the housing, the deflector plate extending downwardly away from the bottom of the housing at an outlet angle and partially defining the fluid outlet of the first fluid flow path, the deflector plate being positioned in the first fluid flow path of the first fluid and in a second fluid flow path of a second fluid, wherein the deflector plate is configured to reduce the flow rate of the first fluid as it travels along the first fluid flow path and is configured to reduce a flow rate of the second fluid as it travels along the second fluid flow path.

14. The apparatus of claim 13, wherein the first internal debris deflector plate is positioned at an angle ranging from about 20 degrees to about 80 degrees from the central axis defined by the housing.

15. The apparatus of claim 13, wherein the deflector plate is configured to reduce the flow rate of the second fluid by directing the debris entrained in the first fluid onto a screen of a shale shaker coupled to the housing.

16. The apparatus of claim 13, wherein (i) the housing is coupled to a possum belly associated a shale shaker coupled to the housing, and (ii) the deflector plate is positioned such that debris entrained in the first fluid does not accumulate in the possum belly and reduce the flow rate of the second fluid.

17. The apparatus of claim 13, wherein the second internal debris deflector plate is positioned at an angle ranging from about 30 degrees to about 70 degrees from the central axis defined by the housing.

18. The apparatus of claim 17, wherein the deflector plate is variably positioned at an angle ranging from about 30 degrees to about 85 degrees from the vertical axis defined by the housing.

* * * * *